Sept. 5, 1950  E. W. DAVIS  2,521,569
LUBRICANT COMPRESSOR
Filed July 27, 1945
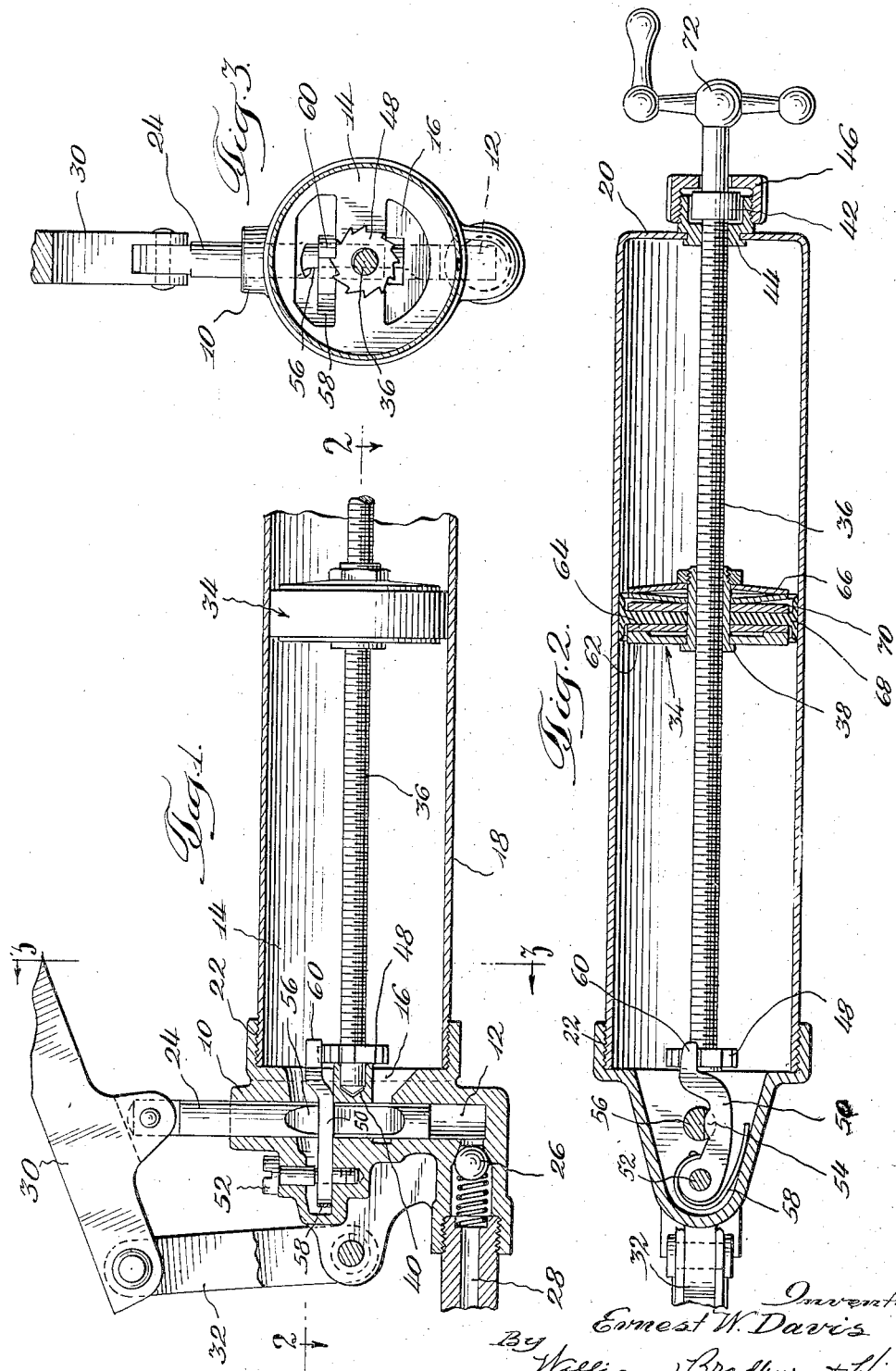

Patented Sept. 5, 1950

2,521,569

UNITED STATES PATENT OFFICE 2,521,569

LUBRICANT COMPRESSOR

Ernest W. Davis, River Forest, Ill.

Application July 27, 1945, Serial No. 607,321

1 Claim. (Cl. 222—256)

My invention relates to lubricant compressors and is more particularly concerned with hand operated lubricant compressors of the lever type.

An object of my invention is to provide new and improved means for mechanically feeding lubricant from a reservoir chamber to a high pressure cylinder.

Another object of my invention is to provide lubricant feeding means having a novel mechanism for automatically regulating the supply of lubricant in accordance with the needs of a high pressure cylinder.

Another object of my invention is to provide an automatic feeding reservoir which may be easily refilled from a conventional lubricant supply source.

Other objects and advantages will become apparent as the description proceeds.

In the drawings, Fig. 1 is a partial longitudinal section through a lubricant compressor embodying a preferred form of my invention.

Fig. 2 is a longitudinal section taken on the line 2—2 of Fig. 1, and

Fig. 3 is a transverse section taken on the line 3—3 of Fig. 1.

The drawing illustrates a portable, hand operated lubricant compressor of the lever type comprising a body 10 provided with a high pressure cylinder 12 supplied with lubricant from a reservoir 14 by way of a port 16. The reservoir 14 is provided by a barrel 18 closed at one end as indicated at 20, and threadedly attached to the body 10, as indicated at 22.

A piston 24 is provided to discharge lubricant from the cylinder 12 past a check valve 26 and through a discharge conduit 28 which may be provided with the usual coupler for making a quick detachable connection with a lubricant receiving fitting attached to the bearing of an automobile or other part requiring lubrication. The piston 24 is reciprocated by a lever or handle 30 attached to the body 10 by a link 32.

Lubricant is forced from the reservoir 14 through port 16 into high pressure cylinder 12 by a follower 34 which is advanced or retracted lengthwise of the barrel 18 by rotating rod 36 having threaded engagement with the hub 38 of the follower 34. The left hand end of the rod 36 is located in a bearing-like recess 40 formed in the body 10. Longitudinal movement of the rod 36 is normally prevented by a collar 42 confined between a cup 44 affixed to the closed end 20 of the barrel 18 and a nut 46 which is threadedly attached to this cup to form an enclosing housing for the collar 42.

My novel means for advancing the follower 34 includes a ratchet wheel 48 attached to the left hand end of the rod 36 and driven by a pawl 50 pivotally mounted on a pin 52, threadedly attached to the body 10. The pawl 50 has a central projection 54 which engages the recessed part 56 of piston 24. A spring 58 urges the projection 54 against the recessed portion of the piston so that as the piston 24 moves up and down, the ratchet engaging end 60 of pawl 50 moves transversely of the barrel 14 and in a direction to operate ratchet wheel 48.

The pawl 50 fits loosely about pin 52 so that the ratchet engaging ends 60 of the pawl can move up and down with the piston for a short distance. As the piston moves downwardly, the friction between the piston and pawl moves the end 60 of the pawl into engagement with a tooth of ratchet wheel 48 and further downward movement of the piston 24 produces a pivotal movement of the pawl which advances this ratchet wheel. This in turn rotates threaded rod 36 and advances follower 34. On the following upward stroke of the piston 24, the friction between this piston and pawl 50 lifts end 60 above the teeth of ratchet wheel 48 and permits spring 58 to move end 60 transversely of ratchet wheel 48 without producing a reverse movement of this wheel and threaded rod 36 attached thereto.

Another feature of my invention lies in the novel means which I have provided to prevent the mechanism from becoming hydraulically locked where the operation of the ratchet mechanism tends to advance the follower 34 faster than is necessary to supply the high pressure cylinder with its lubricant requirements. The follower 34 includes a first clutched disc 62 rigid with hub 38 and a second clutched disc 64 rotatable on hub 38. A pair of spring washers 66 normally hold the discs 62 and 64 of the friction clutch against rotation. The friction disc 64, sealing member 68 and washer 70 are all capable of rotation and axial movement relative to the hub 38. When the ratchet mechanism tends to advance the follower 34 too fast, the pressure of the lubricant in reservoir 14 compresses spring washer 66 and permits clutch disc 62 and hub 38 to rotate with rod 36, and under such circumstances no further advance of the follower 34 occurs until the lubricant pressure in advance of the follower has been dissipated through flow of lubricant from the reservoir into the high pressure cylinder. As soon as the reservoir pressure is thus relieved, spring washer 66 causes the friction clutch to re-engage and hold hub 38 against rotation so that further operation of the ratchet mechanism will advance follower 34.

When it is desired to refill the reservoir 14, the barrel 18 is unscrewed from body 10, and the open end of this barrel is then screwed on to the follower plate of a grease bucket. Nut 46 is then unscrewed and the operator pulls on handle 72 to pull follower 34 toward the closed end 20 of the barrel and fill the entire barrel with lubricant. At the completion of this operation most of rod 36 will be projecting from the closed end of the barrel, and the rod can then be returned to normal position by rotating handle 72. The friction between the follower 34 and barrel 18 is sufficient to prevent rotation of the follower when the rod 34 is screwed back into place by rotating handle 72.

After rod 36 has been returned to normal position, nut 46 is screwed on to cup 44 to hold the rod 36 against further longitudinal movement. Barrel 18 is then removed from the follower plate of the grease bucket and again attached to the body 10 of the lubricant compressor. The compressor is then ready for further use.

A feature of my invention lies in the fact that the lubricant compressor can be quickly refilled from the usual grease bucket or other source of lubricant. If it is desired to further speed up the refilling operation, the rod 36 may be provided with a double instead of a single thread. This will facilitate the return of the rod to normal position after the barrel has been filled with lubricant.

While I have illustrated and described only one form of my invention, it is to be understood that my invention is not limited to the details shown and described, but may assume numerous other forms, and includes all modifications, variations, and equivalents coming within the scope of the appended claim.

I claim:

A lubricant compressor of the class described comprising a body having a cylinder therein, a reservoir barrel attached to said body and extending therefrom at right angles to said cylinder, a piston for discharging lubricant from said cylinder, a handle for operating said piston, said piston having a pawl operating recess, a pawl pivotally attached to said body, a spring for urging said pawl against the recessed portion of said piston, ratchet means operated by said pawl, a rotatable driving element operated by said ratchet means and a follower advanced by said driving element.

ERNEST W. DAVIS.

REFERENCES CITED

The following references are of record in the file of this patent:

UNITED STATES PATENTS

| Number | Name | Date |
| --- | --- | --- |
| 1,306,607 | Montgomery | June 10, 1919 |
| 1,673,004 | Fesler | June 12, 1928 |
| 1,679,855 | Davis | Aug. 7, 1928 |

FOREIGN PATENTS

| Number | Country | Date |
| --- | --- | --- |
| 608,384 | France | Apr. 20, 1926 |